United States Patent [19]
Funk et al.

[11] Patent Number: 5,226,075
[45] Date of Patent: Jul. 6, 1993

[54] METHOD OF AND APPARATUS FOR NUMBERING AND ROUTING CALLS THROUGH A COMMUNICATION NETWORK

[75] Inventors: Michael W. Funk, Mountainside; Sue A. Lawson, Eatontown; David F. McGuigan, Somerset, all of N.J.

[73] Assignee: AT&T Bell Laboratories, Murray Hill, N.J.

[21] Appl. No.: 826,205

[22] Filed: Jan. 22, 1992

Related U.S. Application Data

[63] Continuation of Ser. No. 536,378, Jun. 11, 1990, abandoned.

[51] Int. Cl.⁵ .................................... H04M 3/42
[52] U.S. Cl. .................................... 379/243; 379/289; 379/221; 379/201
[58] Field of Search ............... 379/220, 221, 201, 243, 379/207, 289

[56] References Cited

U.S. PATENT DOCUMENTS

| | | | |
|---|---|---|---|
| 3,560,663 | 2/1971 | Lee et al. | 379/229 |
| 4,017,691 | 4/1977 | Altenburger | 379/220 |
| 4,191,860 | 3/1980 | Weber | 379/211 |
| 4,577,066 | 3/1986 | Bimonte et al. | 379/221 |
| 4,727,577 | 2/1988 | Frey | 379/112 |
| 4,748,661 | 5/1988 | Edlestein et al. | 379/289 |
| 4,757,267 | 7/1988 | Riskin | 379/219 |
| 4,953,203 | 8/1990 | Shepard | 379/207 |
| 5,003,584 | 3/1991 | Benyacar et al. | 379/201 |

Primary Examiner—James L. Dwyer
Assistant Examiner—Ahmad F. Matar
Attorney, Agent, or Firm—John A. Caccuro

[57] ABSTRACT

A communication network uses a network switch number (NSN) and a class-of-service classification (COS) code to route calls through the network. When a call is received at an originating switch of the network, the dialed number is used to select the NSN which identifies a network terminating switch which connects to the called party. The network uses received call signaling information and stored trunk information and possibly network database information to determine the COS code. The COS code is also used at the terminating switch to identify the type of service trunk to connect to the called party. In another feature, only the network switch number is used to route the call over the network. In accordance with yet another feature, the COS code may be used to select specific network trunks without requiring the specification of the NSN.

35 Claims, 7 Drawing Sheets

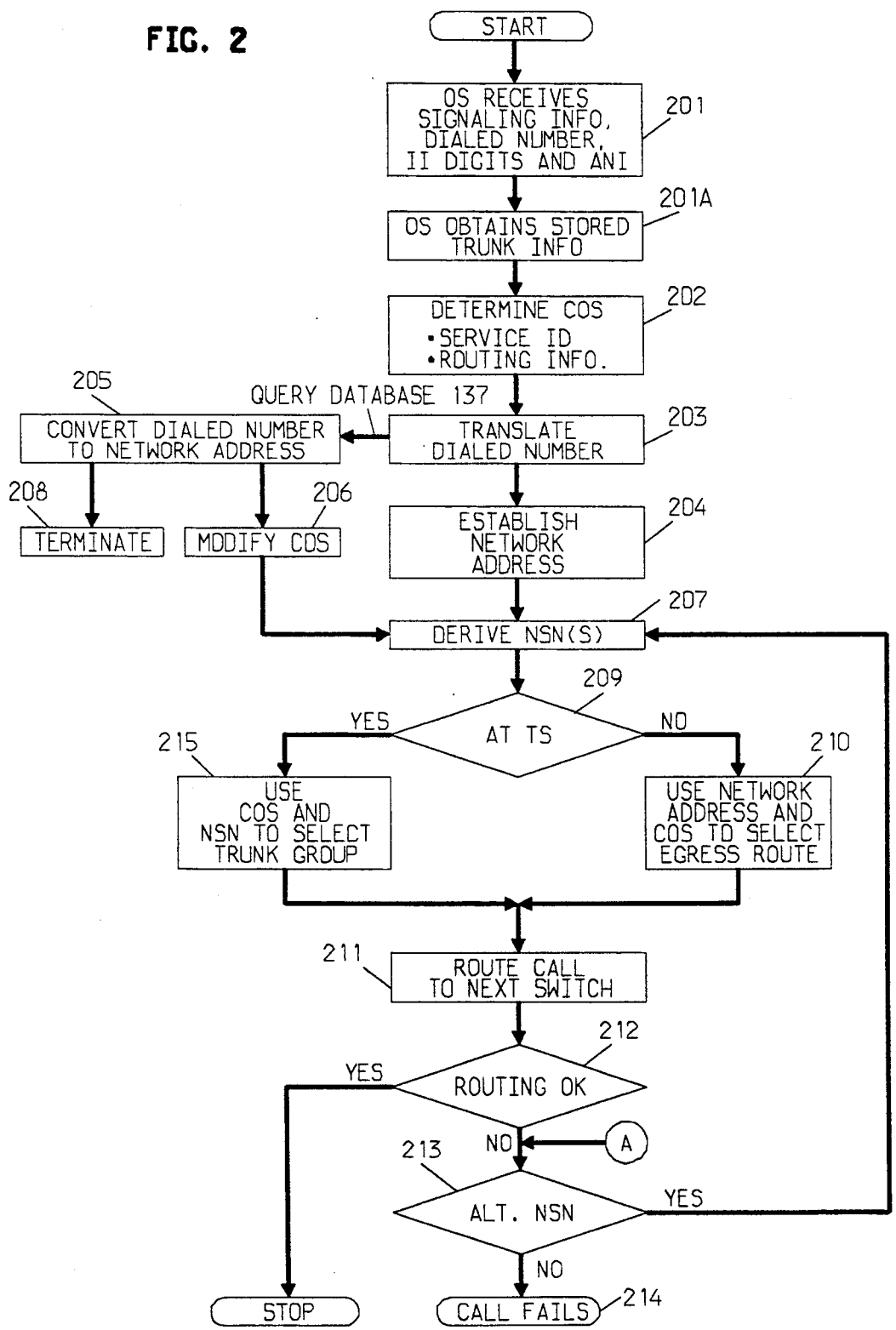

FIG. 3 EXAMPLES OF INFORMATION SIGNALED TO THE ORIGINATING SWITCH

| INCOMING SIGNALED INFORMATION | | | |
|---|---|---|---|
| FEATURE GROUP C | FEATURE GROUP D | Q.931 | NETWORK INTERCONNECT |
| DIALED NUMBER | DIALED NUMBER | DIALED NUMBER | DIALED NUMBER |
| | ORIGINATING NUMBER | ORIGINATING NUMBER | ORIGINATING NUMBER |
| | II DIGITS | | OLI DIGITS |
| | | NSF | NSF |
| | | ISUP PREFERENCE INDICATOR | ISUP PREFERENCE INDICATOR |
| | | BEARER RATE INDICATOR | BEARER RATE INDICATOR |

II = INFORMATION INDICATOR (USED TO INDICATE SOMETHING ABOUT THE CALL)
NSF = NETWORK SPECIFIC FACILITIES (USED TO IDENTIFY SERVICES)
OLI = ORIGINATING LINE INFORMATION (SIMILAR TO II)
ISUP = AN OUT OF BAND SIGNALING PROTOCOL THAT SUPPORTS ISDN

FIG. 4 EXAMPLES OF INCOMING TRUNK INFORMATION

| INFORMATION ELEMENT | COMMENTS |
|---|---|
| DOMAIN (IDENTIFIES NUMBERING PLAN OF DIALED NUMBER) | SOMETIMES IDENTIFIES SERVICE |
| ORIGINATING NUMBER | DIRECTLY CONNECTED CUSTOMERS ONLY |
| TYPE OF ORIGINATION | LEC CONNECTION OR DIRECT CONNECT CUSTOMER |
| SERVICE CLASS MARK | IDENTIFIES SERVICE IF THE TRUNK IS DEDICATED TO A SERVICE |

FIG. 5

EXAMPLES OF CLASS OF SERVICE VALUES

| SERVICE IDENTIFICATION | CIRCUIT SELECTION (CSI) | GRADE OF SERVICE |
|---|---|---|
| LONG DISTANCE | ECHO CANCELERS NEEDED | LOW |
| WATS | ISUP SIGNALING NEEDED | MEDIUM LOW |
| SDN | DIGITAL FACILITIES NEEDED | MEDIUM |
| 800 SERVICES | | MEDIUM HIGH |
| | | HIGH |

FIG. 6

EXAMPLES OF CLASS OF SERVICE DERIVATIONS

| | | | COS | |
|---|---|---|---|---|
| SIGNALING INFORMATION (601) | STORED TRUNK INFORMATION (602) | SERVICE ID (603) | CIRCUIT SELECTION (604) | GRADE OF SERVICE (605) |
| DIALED NUMBER DOES NOT BEGIN WITH 800 | DOMAIN = POTS (NANP) | LONG DISTANCE | NONE | MEDIUM |
| DIALED NUMBER BEGINS WITH 800 | DOMAIN = POTS (NANP) | 800 SERVICE | NONE | MEDIUM LOW |
| DON'T CARE | DOMAIN = SDN (PRIVATE) DIRECT CONNECT | SDN | DIGITAL | MEDIUM HIGH |
| II OR OLI = 93 | DOMAIN = POTS (NANP) | SDN | DIGITAL | MEDIUM HIGH |

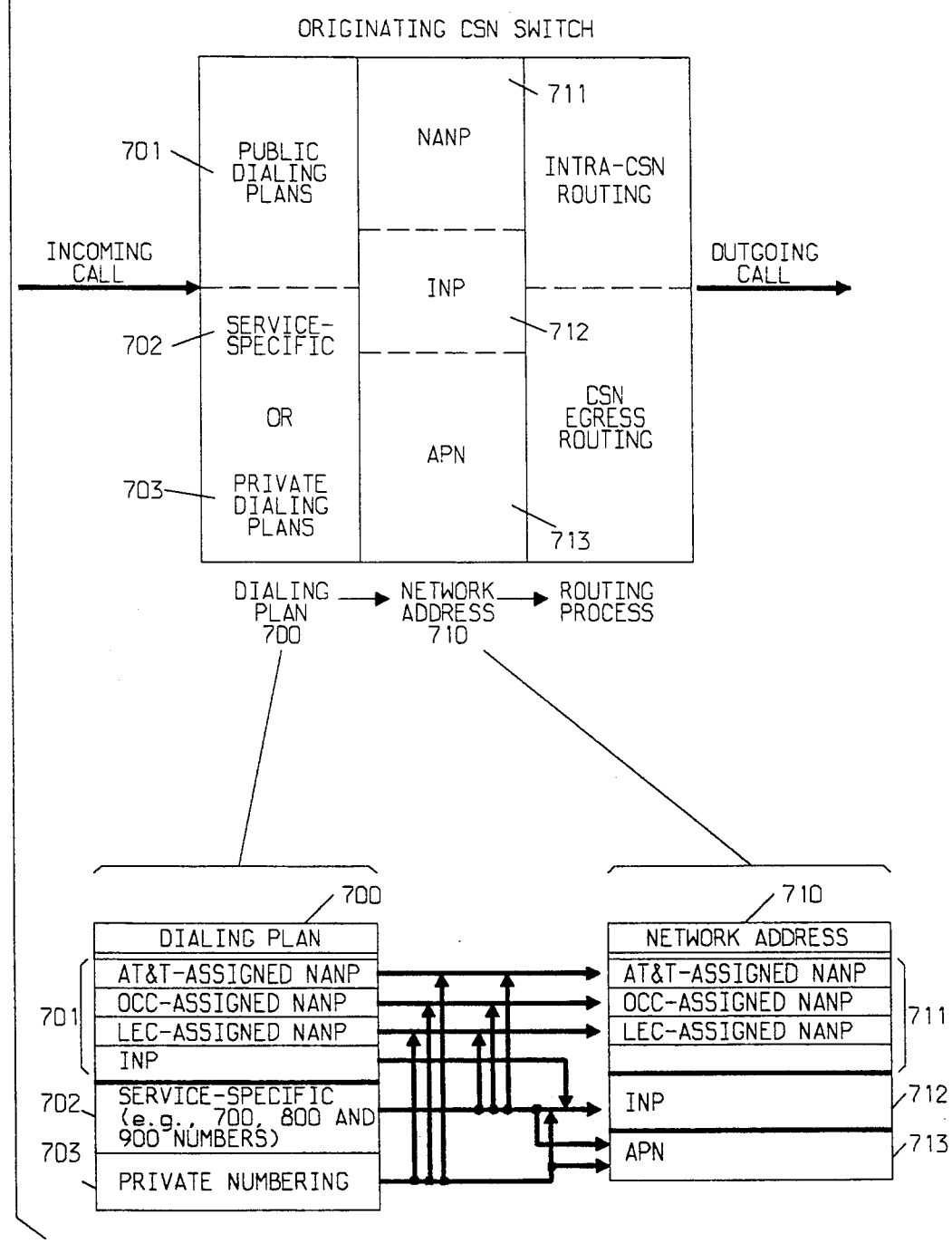

FIG. 8

| NETWORK SWITCH /801 | NETWORK SWITCH NUMBER (NSN) /802 |
|---|---|
| TS1 - 123 | 935 |
| TS2 - 124 | 936 |
| OS - 121 | 937 |
| VS - 122 | 874 |

FIG. 9

| DIALED NUMBER /901 | NETWORK ADDRESS /902 | COS e.g., SERVICE ID /903 | ACTION |
|---|---|---|---|
| 201-949-1234 | 201-949-1234 | LONG DISTANCE | ROUTE TO NSN 935 |
|  |  | SDN SERVICE | ROUTE TO NSN 936 |
| 212-234-1234 | 212-234-1234 | LONG DISTANCE | ROUTE TO NSN 935 |
| 800-456-1234 | 123-456-1234 | 800 SERVICE | ROUTE TO NSN 935 |
|  |  | SDN SERVICE | FINAL HANDLING TREATMENT |

FIG. 10

TRUNK GROUPS AVAILABLE FROM SWITCH 121 TO SWITCH 124

| TRUNK GROUP | DESTINATION | CIRCUIT CHARACTERISTICS |
|---|---|---|
| 131 | NSN = 874 | VOICE GRADE |
| 132 | NSN = 935 | DATA GRADE WITH ECHO CANCELERS |
| 133 | NSN = 936 | VOICE GRADE |

FIG. 11

EXAMPLE OF GRADE OF SERVICE (COS) SCREENING

| TRUNK GROUP | TRUNK GROUP USAGE | COS AVAILABILITY | | | | |
|---|---|---|---|---|---|---|
|  |  | HIGH | MED. HIGH | MEDIUM | MED. LOW | LOW |
| 132 | HIGH | AVAIL. | NOT AVAIL. | NOT AVAIL. | NOT AVAIL. | NOT AVAIL. |
| B | MED. HIGH | AVAIL. | AVAIL. | NOT AVAIL. | NOT AVAIL. | NOT AVAIL. |
| C | MEDIUM | AVAIL. | AVAIL. | AVAIL. | NOT AVAIL. | NOT AVAIL. |
| D | MED. LOW | AVAIL. | AVAIL. | AVAIL. | AVAIL. | NOT AVAIL. |
| E | LOW | AVAIL. | AVAIL. | AVAIL. | AVAIL. | AVAIL. |

FUNCTIONAL CALL PROCESSING – VIA CSN SWITCH

FUNCTIONAL CALL PROCESSING – TERMINATING CSN SWITCH

METHOD OF AND APPARATUS FOR NUMBERING AND ROUTING CALLS THROUGH A COMMUNICATION NETWORK

This application is a continuation of application Ser. No. 07/536,378, filed on Jun. 11, 1990, now abandoned.

TECHNICAL FIELD

This invention relates to communication networks and, more particularly, to a method of and apparatus for numbering and routing calls through a communication network.

BACKGROUND OF THE INVENTION

The communication network call numbering and routing plans generally being used today in carrier switch networks (CSN) are becoming too cumbersome to support the rapid introduction of new services and capabilities. Every new service that is introduced either reuses the numbering capabilities of an existing service (which may not make good use of network resources) or creates a new numbering plan (e.g., 800 or 900-type calls) using existing network capabilities (which may not meet the new services needed in an efficient manner). Moreover, many of these new numbering plans are assigned by the host network (e.g., Local Exchange Carriers, LEC) or by large private network customers (e.g., Federal Telecommunication System, FTS) who assign dialing numbers to conform to their own needs rather than to the needs of the CSN. The routing of this increasing variety of call types through the network requires that each network switch node be able to translate the dialed numbers into network-specific numbers to determine the appropriate call routing. The network-specific numbers form a network address plan for the CSN.

The rapid introduction of new, service-specific numbering plans is creating a complicated and inefficient use of network resources and is becoming increasingly difficult to administer in an accurate and timely fashion. As a result, the cost to support and administer this increasing variety of reused and new service-specific number assignment and routing plans has, therefore, become increasingly expensive, complex, inadequate for billing purposes and may affect the high quality of network services that customers demand.

SUMMARY OF THE INVENTION

The foregoing problems are solved and an advance over the prior art is achieved in accordance with the method and apparatus of the present invention wherein a call is routed through a communication network using a Network Switch Number (NSN) and a Class-of-Service (COS) code. When a call is received by the originating switch of the network, the dialed number and the COS code are used to select a network switch number which identifies the terminating network switch within the CSN. The network uses call characteristics such as received call signaling information and stored trunk information to determine a Class-of-Service (COS) code (i.e., service code) to identify the type of call being routed through the network. The call is then routed (i.e., the facilities and switch nodes are selected for the call) through the various switches of the network using the network switch number and the service code. The service code is also utilized at the terminating switch within the CSN to identify the type of trunk to connect to the called party (either directly or via another network, e.g., a LEC network).

In another feature of the present invention, only the Network Switch Number is used to route the call over the network to the terminating switch. In yet another feature, the service code alone may be utilized to select the facilities used to connect the call between the various switch nodes of the network.

BRIEF DESCRIPTION OF THE DRAWING

In the drawing,

FIG. 2 shows a functional call processing flow diagram describing the operations at an Originating Switch (OS) of CSN;

FIG. 3 is a table showing examples of information signaled to the Originating Switch by an incoming call;

FIG. 4 is a table showing the types of incoming trunk information that may be stored at the Originating Switch;

FIG. 5 is a table showing typical values for the three components of the (COS) service classification code;

FIG. 6 is a table showing examples of how the Originating Switch maps the signaling and trunk information into the three components of COS;

FIG. 7 shows the translation of the existing dialing plan to the network address plan supported by CSN;

FIG. 8 shows the assignment of the Network Switch Numbers (NSNs) to the network switch offices of CSN;

FIG. 9 shows several examples of dialed number translations;

FIG. 10 shows an illustrative trunk group selection table;

FIG. 11 shows an illustrative trunk group selection table having grade of service screening;

GENERAL DESCRIPTION

Figure 1:
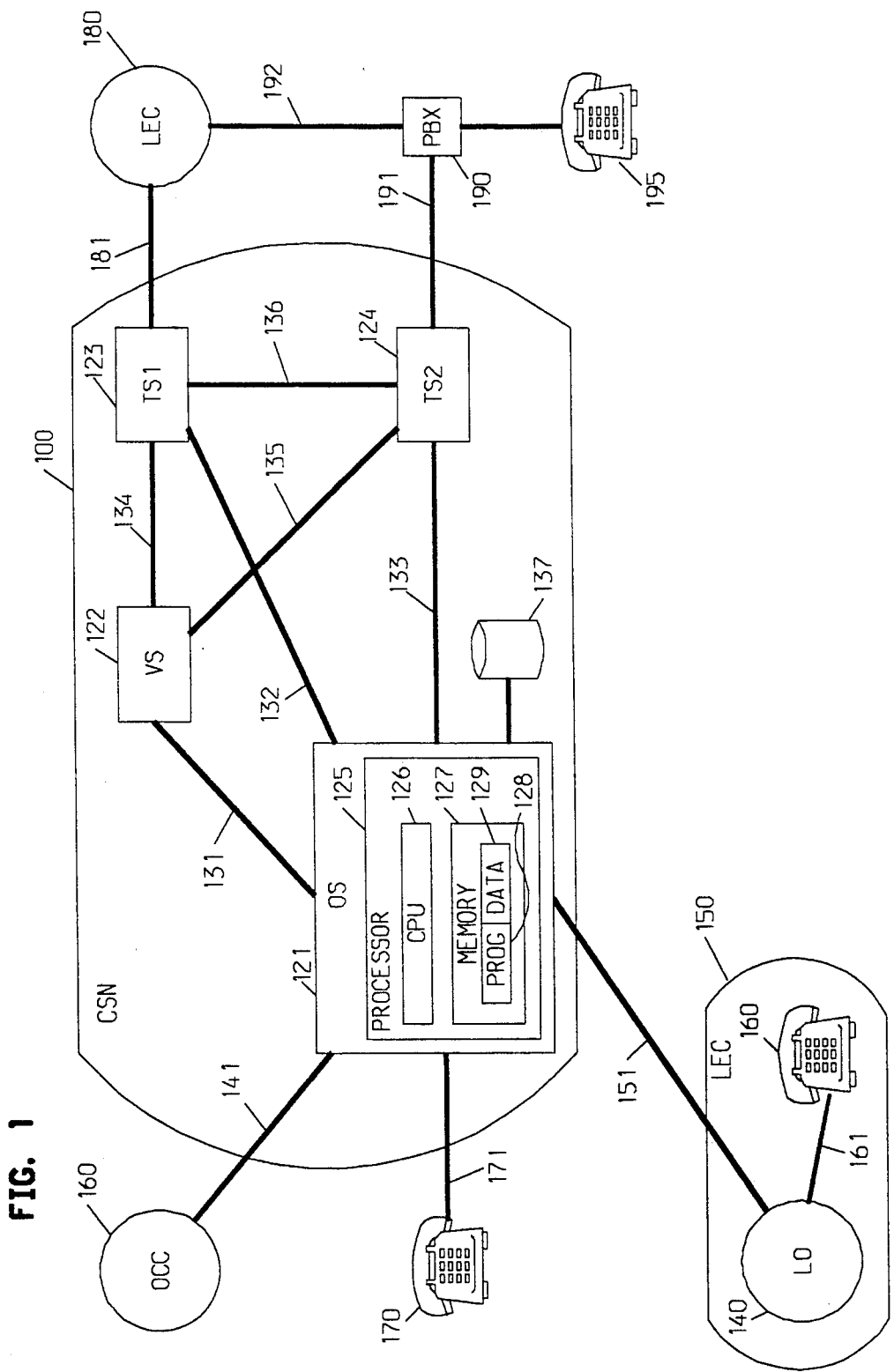
FIG. 1 shows an illustrative Carrier Switch Network (CSN) useful in describing the present invention.

Shown in FIG. 1 is an illustrative Carrier Switch Network (CSN) 100 including a plurality of toll switching system offices 121-124 interconnected by a plurality of trunks 131-136. The CSN 100 may be, illustratively, the American Telephone and Telegraph Company (AT&T) switch network. The toll switching offices 121-124 may be, by way of example, 4ESS digital switches available from AT&T. This well-known digital switch is described in detail in *The Bell System Technical Journal*, Vol. 56, No. 7, Sept., 1977, and Vol. 60, No. 6, part 2, July-August, 1981, which descriptions are incorporated by reference herein. Each of the switching offices 121-124 are controlled by a processor, e.g., 125, comprising CPU, e.g., 126, and memory, e.g., 127. A program memory 128 stores a system of programs to establish and control incoming and outgoing calls using data stored in data memory 129. The program memory 128 includes the program steps outlined in the flow charts and the data memory 129 includes the data tables shown in the various figures of this specification.

Switching office 121 is an Originating Switch (OS), switching office 122 is a Via Switch (VS), and switching offices 123 and 124 are Terminating Switches (TS) for the example call flows. Originating Switch 121, as well as other switches of CSN 100, have access to a database 137 to obtain specific information needed to process certain types of calls. Switching offices 121-124 selectively interconnect individual trunks 131-136 in response to routing information, such as the dialed telephone number of the called customer line received from a Local Exchange Carrier (LEC) 150 network, Other Common Carrier (OCC) 160 or telephone customer 170.

The LEC 150 is shown, illustratively, to connect to CSN 100 via trunk 151. More particularly, local switching office (LO) 140 of LEC 150 connects over trunk 151 to toll switching office 121 of CSN 100. The LO 140 serves a plurality of customers, illustratively represented by station set 160. Station set 160 connects to LO 140 via line 161. Station set 170 connects directly to CSN 100 via a private line, i.e., 171. A number of Other Common Carriers (OCC) illustratively represented by network 160 may also connect to the CSN 100 via trunk 141.

The LEC 180 connects via trunk 181 to CSN 100. Customer apparatus, illustratively, a Private Branch Exchange (PBX) 190 is shown connected via a private trunk 191 to CSN 100 and connected via trunk 192 to LEC 180. The PBX 190 serves a plurality of station sets, illustratively represented by station set 195, which can receive or originate calls over trunks 191 and 192 in a well-known manner. An understanding of the well-known operation of LECs 150 and 180 are not required for an understanding of the present invention and will not be further described.

A typical call routing operation will be described as originating from station set 160 and terminating on PBX 190. Similarly, a call can originate from station set 170 and also terminate on PBX 190 in the same manner.

In a prior art, the call routing process starts with the receipt of the dialed number from LEC 150 (i.e., station 160 and LO 140) and ends with the call leaving CSN 100 at a particular point of egress (i.e., terminating switch 123 or 124). The dialed number which enters CSN 100 is used to determine the destination for the call. While the ultimate destination of the call (i.e., PBX 190) is unambiguous, the point of egress (i.e., terminating switch TS1 123 or TS2 124) from CSN 100, may vary as a function of a number of parameters. Thus, for example, a call dialed to station 195 behind PBX 190 may be routed over facility 191 or 192. If the call is to be completed through LEC 180 over special digital facilities then, perhaps, facility 192 is used. However, if only a voice grade egress facility is required, then, perhaps, facility 191 may be used. Since it is the responsibility of CSN 100 to route the call only to its point of egress from CSN 100 and not necessarily to its final destination, CSN 100 must have some way of identifying the switch at the point of egress. In the prior art, each switching machine translated the dialed number and made independent decisions on how to route the call based on its translation of the dialed number.

In accordance with the method and apparatus of the present invention, each switch 121-124 of CSN 100 is identified by a unique Network Switch Number (NSN). All calls are routed through CSN 100 using the terminating switch NSN as part of the routing number.

DETAILED DESCRIPTION

The present invention provides a single comprehensive dialing and routing plan for CSN 100. The plan is (1) designed to meet the future needs of CSN 100, (2) uniformly applicable to all services offered by CSN 100, and (3) conceptually (and administratively) simple to operate and maintain.

Before proceeding with the operating description of our inventive method and apparatus for numbering and routing calls through a communication network, it should be recognized that our invention may be adapted for use with a variety of switching offices 121-124 which can be arranged to implement CSN 100 shown in FIG. 1. Since the various switching offices shown in FIG. 1 utilize a variety of hardware and programming techniques, no attempt is made to describe the existing programs used to control these various systems. However, using the following description as a guide, the operations of the present invention should be integrated into the control structure of the various switching offices of FIG. 1, and tailored to cooperate with other features and operations of those systems. Thus, in order to avoid confusion and enable those skilled in the art to practice the claimed invention, this specification will describe the operation of the present invention using the network block diagram of FIG. 1, the call flow diagrams of FIGS. 2, 12 and 13 and the various commands, records and databases as shown in FIGS. 3 through 11. In the following description, the first digit of an element's reference number designates the figure where the element is located (e.g., trunk 131 is located in FIG. 1).

I. Originating Switch Call Processing (FIG. 2)

With joint reference to FIGS. 1 and 2, the functional call processing which occurs at the Originating Switch 121 of CSN 100 is described for calls arriving from LEC network 150 over trunk 151. When a call arrives at the Originating Switch 121, two types of information about that call are known. One type is signaling information signaled to the switch over trunk 151 from the local office 140 and the second type is stored information that is associated with trunk 151 used for the call.

In step 201, the signaling information received by Originating Switch 121 generally includes at least the dialed number, originating number (typically referred to as Automatic Number Identification (ANI), and Information Indicator (II) digits. Shown in the table of FIG. 3 are examples of the various types of signaling information received by Originating Switch 121 for incoming calls using one of the standard formats (Feature Group C and D, Q. 931 and CCS7 Network Interconnect).

In step 201a, Originating Switch 121 obtains the stored information associated with the particular incoming call trank (e.g., 151) shown in the table of FIG. 4. Typically, this information includes three well-known types of information including domain, type of origination and a service class mark. If the trunk is directly connected to a customer (e.g., 171), the stored information will usually include an originating number.

An objective of the present invention is to provide a generic routing number capability in CSN 100 that is independent of the services being offered. Given such a capability, a mechanism is provided to convey the service-related information and requirements of the call so the network processes the call correctly and the appropriate information is delivered to the next switch, or to the customer, when the call egresses from CSN 100. This function is provided in accordance with the present invention, by the Class of Service (COS) code. The COS code determines how the call will transit CSN 100 and egress from a Terminating Switch, e.g., which trunk subgroup will be used and what signaling information will be passed forward.

In step 202, Originating Switch 121 determines the Class of Service (COS) code for the incoming call. The COS parameters are a collection of information elements that form part of the signaling information used to establish the call. These information elements identify network-specific requirements for the call, such as: facility selection, signaling type selection, bearer capabilities and routing restrictions. In addition, the COS code identifies the type of service the CSN is providing (e.g., MEGACOM ® 800, Software Defined Network [SDN], etc.) and may be used to support the recording and screening functions and in the determination of the Network Address to which the call is to be routed. The COS code maybe determined from three sources: signaling information (FIG. 3) received by CSN 100 from the local switch (e.g., 140) at the time the call is initiated, static information (FIG. 4) that the Originating Switch (i.e., OS 121) has stored regarding the incoming trunk (i.e., 151 in our example); and call handling and service-related information that may be returned from a network database 137.

With reference to the table of FIG. 5, the COS code is composed of three parameters or components:

Service Identification—a number assigned to each service that uniquely identifies that service.

Circuit Selection—specified by a Circuit Selection Index (CSI), a specification of circuit (or trunk) characteristics that are required for the call.

Grade-of-Service (GOS) indication—a specification of what relative priority the switch should assume in processing this call relative to other calls.

FIG. 5 shows typical values for each of the COS code components. The COS code for a specific call is determined from a mapping of the signaling and trunk information (FIGS. 3 and 4) through a table resident in the originating switch 121. An example of such a mapping is shown in the table of FIG. 6.

In step 203, the dialed number, part of the signaling information 601, is translated in Originating Switch 121 using standard digit analysis techniques, except that the Service ID component 603 of the COS code may (optionally) be used as an additional variable in determining the result of the analysis. With particular reference to FIG. 7, the procedure for translating the dialed number of the incoming call is described. A dialed number, as used in this specification, refers to the string of digits received by CSN 100 that indicates where the call is destined. Note, in principle, there is not reason why alphanumeric strings could not be used in this plan. These digits could originate from a CSN 100 direct-Connect Customer Location (e.g., 107) or be passed to the CSN 100 by an LEC (e.g., 150), Other Common Carrier (OCC), international network or private network. Since these numbers originate outside CSN 100, the CSN 100 may have little influence on how they are formatted and assigned. For this reason, the CSN 100 in accordance with the present invention must be capable of accepting virtually any type or style of dialing plan.

As illustrated in FIG. 7, in order to support such diverse types of dialing plans, the dialing number plan 700 of the present invention requires that any public 701, service specific 702 or private 703 dialing plan number that enters CSN 100 be mapped into one of three types of network addresses 710 that will be supported by CSN 100. The three types of network addresses 710 include the (1) North American Numbering Plan (NANP) 711 (excluding special service codes, e.g., 700, 800 and 900 numbers), (2) International Numbering Plan (INP) 712 for the ISDN-era (E.164), and (3) the Action Point Numbering (APN) plan 713. The APN plan is a private numbering plan administered by CSN 100 for the purpose of identifying customers (or attachments to a customer) of CSN 100 who are directly connected to its network (e.g., 191).

Each of the three network address numbering plans are known to CSN 100 and are used to uniquely identify a called customer location or an attachment to a customer. Each service offered by CSN 100 is responsible for defining how it will support the FIG. 7 mapping function from the dialed number to the network address. The mapping function that translates a dialed number to a network address may be a simple mapping (i.e., the dialed number may be the same as the network address). Such a simple mapping occurs, for example, in step 204, when either NANP or International E.164 numbers are used as the network address. In such an example, the NANP numbers of the public dialing plan 701 are mapped into the NANP network address 711. Similarly, International numbers of the public dialing plan 711 are mapped into the International number network address 712.

For services that use service-specific dialing plans 702, (e.g., 700, 800 and 900-type numbers) the mapping function may require a query to database 137 to determine if the dialed number should be mapped to an AT&T or LEC-assigned NANP 711, an International number 712 or an APN plan 713 network address. This type of database query is similar to that in use today to support 800 services. Similarly, private numbering plans 703 require a database 137 query to map the numbers into a NANP 711 or International number 712 or an APN plan network address.

After the dialed number is mapped to a network address in step 205, the COS code may have to be modified, step 206, based on customer-specific data provided by the network database 137. For example, a customer may specify a Grade-of-Service 605 or a facility type 604 that is different from those values specified in FIG. 6. In such a case, the COS values specified in step 206 would supersede those determined in step 202. This provides the flexibility to customize the service offerings to individual customers. In step 204, the dialed number (701-703) has been translated or mapped into an appropriate network address 710.

In accordance with the present invention, a single uniform Routing Number Plan is used in routing the call from the Originating Switch to the Terminating Switch. This uniform Routing Number Plan assigns a unique multidigit code (a three-digit code will be assumed hereinafter) called a Network Switch Number (NSN), to every switch within the CSN 100. The NSN is derived from a translation of the network address 710 and consideration of the service code parameter values. Thus, with reference to FIG. 1, each network switch, OS, VS, TS1, TS2, is assigned a unique NSN. Shown in FIG. 8 is a table which associates each network switch with an NSN. Each of the switches, OS, VS, TS1, TS2, of our example network CSN 100 of FIG. 1, are listed along with their respectively assigned NSN, i.e., 927, 874, 935 and 936. In step 207 Originating Switch (OS) 121 derives the Network Switch Number (NSN) of the Terminating Switch (TS) from which the call will egress CSN 100. The NSN is derived from a translation of the network address 710 and consideration of the service code parameter values.

The table of FIG. 9 shows several illustrative examples of the results of the previously-described number translation. Using the network address 901 and service ID data 902, an appropriate action 903 to complete the call is determined. The result of the digit analysis of FIG. 9 is typically one of the following actions:

A. Route the call to a distant switch within the same network. This procedure involves the steps 203, 204 and 207. The result of this analysis is the identification of the Network Switch Number (NSN) of the terminating (final) switch in CSN 100. This NSN uniquely identifies that switch as the destination of the call. Thus, for example, with reference to FIG. 1, for a call from station 160 to a station behind PBX 190, the call could egress or leave CSN 100 via terminating switch TS2 124. Thus, the identified NSN would be that of TS2 124. The remainder of the call processing proceeds as described in a subsequent paragraph.

B. Route the call directly to a switch outside of the network, (e.g., LEC 150). This occurs, for example, when the terminating network switch number (NSN) is the same as the network switch number of the originating switch (OS) in the network. This procedure involves the steps 203, 204, 207, 209 and 215. The result of the analysis is to identify a facility to route the call out of CSN 100 to the non-network switch shown in steps 215 and 211. Thus, with reference to FIG. 1, for a call from station 170 to station 160, the call could exit CSN 100 via Originating Switch 121. The trunk 151 would be the identified facility to route the call from CSN 100 to the distant switch LEC 150. Call processing then proceeds as described in the terminating switch call processing section of this specification.

C. Query a database to obtain call processing instructions. This procedure involves steps 203, 205, 206 and 207. The result of the analysis is to temporarily suspend call processing while a database (e.g., 137) is queried to obtain customer (or service) specific instructions. These instructions usually include a new network address for the call and may include changes to the COS elements that had been previously determined. Call processing continues with the new network address which is then translated in the origination switch 121 as described above.

D. Terminate the call, if the call is invalid or unauthorized (such as an 800 dialed call on Software Defined Network (SDN). This is shown in steps 203, 205 and 208. In this circumstance, the Originating Switch 121 provides final call handling treatment to the call and may provide an appropriate announcement or tone to the caller.

Returning again to the flow chart of FIG. 2, in step 209, Originating Switch 121 determines, using the NSN, if Terminating Switch (TS2 124) is the same as Originating Switch 121. In step 209, if Terminating Switch 124 is found to be the same as Originating Switch 121 (i.e., only one CSN 100 switch is used in routing the call), then, in step 215, the originating switch 121 uses the COS information to select a trunk group to enable the call to egress from CSN 100. In step 211, the call egresses or is routed from CSN 100. With reference to FIG. 1, such a situation would exist when a caller at station 170 calls station 160. Thus, Originating Switch 121 would also be the Terminating Switch.

Assume that Originating Switch 121 is not the Terminating Switch. Such would be the case for our illustrative call from station 160 to station 195 located behind PBX 190. Since Terminating Switch 124 is found to be different from the Originating Switch (i.e., multiple switching offices are used in routing the call), the NSN associated with Terminating Switch 124 is used to route the call.

In step 210, the NSN and COS are used to select a trunk path out from the originating switch 121 toward the Terminating Switch 124. The NSN is used to select one or more groups of trunks to the terminating switch or to a Via Switch that can reach the Terminating Switch. The trunk selection and prioritization (call routing) proceeds in a well-known manner, which is not described further hereinafter. An example of the result of this trunk group selection process is shown below in the table of FIG. 10.

Once the candidate trunks have been selected, the COS is used to screen the trunks to select one or more that satisfy the facility requirements for the call. In the example above, if the call is for a data service and the COS indicates that echo cancelers are required, only trunk group 132 (see FIG. 10) will pass the COS screening process. For a typical call, more than one circuit characteristic would be considered.

Once one or more trunk groups have been identified that satisfy the circuit selection criteria, the Grade-of-Service Screening (GOS) is used to control the call's access to the trunks. An example is shown in the table of FIG. 11, where five trunk groups 132, B-E, have passed the above criteria. This screening capability allows different customers or services different priorities when network resources become scarce. In this example, trunk group 132 is available to support the call only if the customer or the service is entitled to a "High" grade of service.

Once a circuit (trunk) has been selected, in step 211, the following information, in addition to that otherwise associated with a call, is signaled to the next switch:
COS; Service ID, CSI and GOS.
NSN of the Terminating Switch.

If the call is successfully routed through to Terminating Switch 124, step 212, the originating switch call processing is completed. If the call routing is not completed, then either the Terminating Switch 124 or any Via switching office 122 returns call control back to originating office 121. In step 213, Originating Switch 121 selects an NSN of an alternate Terminating Switch. In our illustrative call to the station set located behind PBX 190, the NSN associated with TS1 123 (i.e., 935) is an alternate Terminating Switch which can be used to complete the call.

If no alternate NSN exists, then in step 214, a "cannot complete call" message is delivered to the caller.

Figure 12:
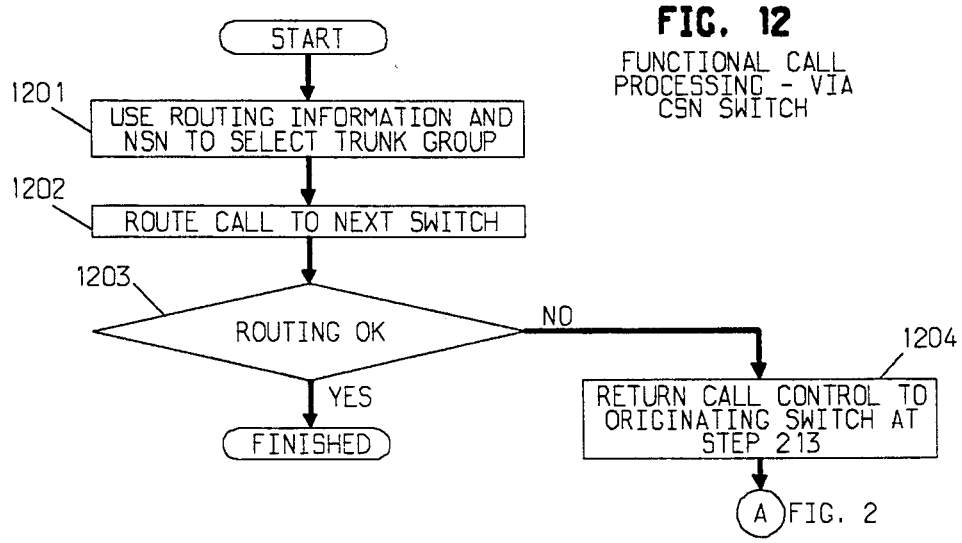
FIG. 12 shows a functional call processing flow diagram describing the operation at an intermediate or Via Switch (VS) of CSN.

II. Via Switch (VS) Call Processing (FIG. 12)

Assume that our illustrative call from station set 160 to a station set located behind PBX 190 has been routed by originating switch 121 to Via Switch (VS) 122. The following paragraph references the flow chart of FIG. 12.

The NSN and COS received from Originating Switch 121 are used, in step 1201, to select a path from the Via Switch 122 toward the Terminating Switch 124. The NSN is used to select one or more groups of trunks (using a table like that shown in FIG. 10) to the Terminating Switch 124 or to a Via Switch (such as VS 122, or other switches not shown in FIG. 1) that can reach Terminating Switch 124. This patent application does not rely upon or drive this trunk selection and prioritization process. Once the candidate trunks have been selected, the COS is used to screen the trunks to select one or more that satisfy the facility requirements for the call.

Note that an important aspect of this capability is that call processing at the Via Switch is minimized. Only the NSN and the COS are needed to process the call.

Once a circuit (trunk) has been selected, in step 1202, the following information, in addition to that otherwise associated with the call, is signaled to the next switch:
COS; Service ID, CSI and GOS.
NSN of the Terminating Switch.

If call routing is successful, step 1203, Via Switch 122 call processing is then complete. If call routing is not successful then, in step 1204, control is returned to Originating Switch 121.

Figure 13:
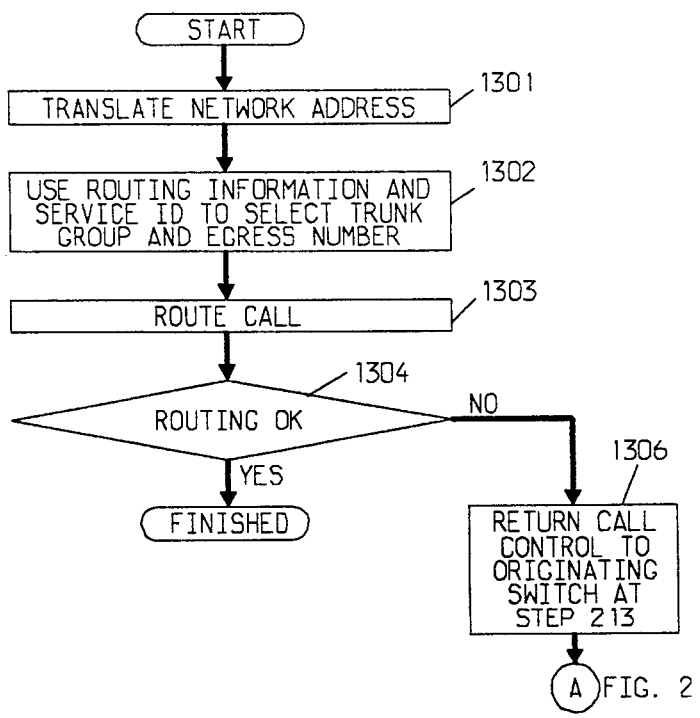
FIG. 13 shows a functional call processing flow diagram describing the operation at a Terminating Switch (TS) of CSN.

III. Terminating Switch Call Processing (FIG. 13)

Digit analysis of the Network Address number, in step 1301, in conjuction with the Service ID, CSI, and GOS is used to select, in step 1302 (using a table similar to FIG. 9), the egress facilities out of the network. The facility selection process utilized is well-known in the art and will not be further described hereinafter. However, the Service ID and the CSI may (optionally) be used to select among the egress facilities. In step 1303, the call is then routed over these facilities, via either LEC 180 or trunk 191 to the receiving location PBX 190. Again, if call routing is successfully completed, in step 1304, call processing is complete. If, however, call routing is not successful, then control is returned, in step 1306, to Originating Switch 121.

The uniform Routing Number Plan of the present invention provides a number of benefits. First, routing between CSN 100 switches (intra-CSN switch routing) becomes very simple, requiring only an analysis of the NSN. While a three-digit number has been assumed in this description, it should be noted that smaller networks could require less digits and larger networks might need more than three digits.

Secondly, when more than two CSN switches are used in routing a call (i.e., there is at least one Via Switch), retranslation of the Network Address is not required in the Via Switches. Thus, the NSN is used directly at the Via Switch. Since the Originating Switch is responsible for determining the NSN of the Terminating Switch, ambiguous routing situations are avoided.

Thirdly, the plan provides a single routing number plan that will support all the services offered by the CSN 100.

While the present invention has been described in the context of a Carrier Service Network, it should be understood that it could be implemented in local exchange carriers (LECs) or in large private networks (e.g., Federal Telecommunication Systems, FTS) in a straightforward manner. Moreover, the particular invention may be readily adapted using well-known techniques for use with other program-controlled network digital switches.

The disclosed network embodiment of the present invention described using both a Network Switch Number (NSN) and a Class-of-Service (COS) code to select trunks over which the call should be routed. It should be understood, however, that in accordance with the present invention, under certain circumstances, the Class of Service for a call may not be relevant and, hence, the Originating Switch may utilize only the NSN to route the call through the network. This may arise, for example, where the network has only one type of trunk, which is used for all calls routed over the network. In accordance with another embodiment of the present invention, the NSN may be utilized to route calls through the network while the COS code is utilized only to select trunks at the terminating switch which egress the call from the network. It should also be understood, that in accordance with the present invention, the COS code may be used to select facilities (e.g., trunks) over which the call should be routed without regard to how the destination for the call is identified, e.g., without the explicit identification of the NSN.

While the disclosed embodiment of the present invention describes the originating switch as the location which determines the network switch number (NSN) and service (COS) code, it should be understood that any switch or other location of the network could be sent the appropriate data to make such a determination. Thus, for example, a centralized location having a centralized database may be utilized for determining the NSN and the COS code.

Thus, what has been described is a preferred embodiment of the present invention. It is contemplated that other arrangements or embodiments can be used by those skilled in the art to implement the present invention without deviating from the spirit and scope of the present invention.

We claim:

1. A method of routing calls through a communication network including a plurality of interconnected switch nodes, comprising the steps of
    receiving, at an originating switch node, a dialed number from a calling party desiring to establish a call to a called party location, said dialed number being used to select a network switch number (NSN) which is selected independent of a calling party number, and which identifies a terminating switch node which connects to said called party location, the value of said network switch number (NSN) not being a subset of said dialed number and not being a subset of any telephone number translated from said dialed number,
    routing said call over said network to said terminating switch node using the selected network switch number, and not said dialed number.

2. The method of claim 1 further comprising the step of
    determining a class-of-service (COS) code derived from one or more call characteristics, said service code being used to select facilities over which the call is routed over said network.

3. The method of claim 1 further comprising the step of
    determining a class-of-service (COS) code derived from one or more call characteristics, said service code also being used to effect the selection of the network switch number.

4. The method of claim 1 further comprising the steps of
    determining a class-of-service (COS) code derived from one or more call characteristics, said service code being used together with said selected network switch number by said routing step to route said call over said network and
    at said terminating switch node, using the service code to select a facility to connect to said called party location.

5. The method of claim 4 wherein the service code includes one or more values selected from a group of values including a service identification value, a circuit selection value which is indicative of the specification of circuit characteristics required for said call, and a grade-of-service value, all said values determined from said one or more call characteristics.

6. The method of claim 4 wherein said one or more call characteristics includes signaling information received from the calling party and stored information associated with an incoming facility over which the call is received.

7. The method of claim 4 wherein said determining step is performed at an originating switch node that receives the call from the calling party.

8. The method of claim 4 wherein said network switch number and said service code are sent over the same network facilities.

9. The method of claim 4 wherein said network switch number and service code are sent over separate network facilities.

10. The method of claim 1 wherein said dialed number is translated into a network address using one of a plurality of predetermined network address numbering plans of said network.

11. The method of claim 10 wherein said plurality of network address numbering plans includes one or more of numbering plans selected from a group including a North American plan, an international plan, and an action point plan.

12. The method of claim 1 wherein said one or more call characteristics is selected from a group including the dialed number, the calling party number, a billing number provided by the calling party, a facility used to connect the calling party to the network, and the type of apparatus used by the calling party.

13. The method of claim 1 wherein said dialed number is part of numbering plan which is one of a group of numbering plans including a public dialing plan, a service-specific dialing plan, and a private dialing plan.

14. The method of claim 1 wherein said dialed number is used to determine a network address for the call and wherein said network address is used to select the network switch numbers.

15. The method of claim 14 wherein the dialed number is a private party number, wherein the network address is determined from said dialed number using a dialed number mapping means, and wherein said mapping means and other call routing information is specified by said private party.

16. A method of operating an originating switch node of a communication network comprising the steps of
receiving a dialed number over a trunk connected to said originating switch node for establishing a call to a called party location, said dialed number being used to select a network switch number (NSN) which is selected independent of a calling party number and which identifies a terminating switch node of said network which connects to said called party location, the value of said network switch number (NSN) not being a subset of said dialed number and not being a subset of any telephone number translated from said dialed number, and
transmitting said network switch number over a second trunk to another switch node of said network when the selected network switch number is not the same as the network switch number associated with originating switch node.

17. The method of claim 16 further comprising the step of
determining a class-of-service (COS) code derived from one or more call characteristics and also using said service code to effect the selection of the network switch number.

18. The method of claim 16 further comprising the step of
determining a class-of-service code derived from one or more call characteristics and sending the service code over said second trunk.

19. The method of claim 18 further comprising the step of
using the service code to select a facility to connect to said called party location when the selected network switch number is the same as the network switch number of the originating switch node.

20. The method of claim 18 wherein said second trunk is selected from a plurality of trunks which provide different egress facilities from said network.

21. The method of claim 18 wherein said second trunk is selected using one or more information types selected from a group including, a network address, a class-of-service code, and a network switch number.

22. A method of operating an intermediate switch node of a communication network including at least three switch nodes, one of the switch nodes being an originating switch node which receives a dialed number from a calling party, said method comprising the steps of
receiving, over an incoming trunk, said intermediate switch node call routing information including a network switch number (NSN) which is selected independent of a calling party number, whose value is not a subset of said dialed number and is not a subset of any telephone number translated from said dialed number, and which identifies a terminating switch node,
selecting an outgoing trunk to another switch node using said network switch number, and
transmitting said network switch number over said selected outgoing trunk.

23. The method of claim 22 wherein said receiving step receives a class of service code, said selecting step using said service code in the process of selecting said outgoing trunk, and said transmitting step transmits said service code over said outgoing trunk.

24. A method of operating a terminating switch node of a communication network including a plurality of switch nodes, one of said plurality of switch nodes being an originating switch node which receives a dialed number from a calling party, said method comprising the steps of
receiving, over an incoming trunk, call routing information associated with a call received by said terminating switch node, said call routing information including a class-of-service code, and a network switch number which is selected independent of a calling party number and which identifies said terminating switch node, the value of said network switch number (NSN) not being a subset of said dialed number and not being a subset of any telephone number translated from said dialed number, and
using the service code to select a facility to connect said call to a called party location.

25. A communication network including a plurality of interconnected switches, said network comprising originating switch including means for receiving a dialed number from a calling party desiring to establish a call to a called party location, said dialed number being used to select a network switch number (NSN) which is selected independent of a calling party number and which identifies a terminating switch which connects to said called party location, the value of said network switch number not being a subset of said dialed number and not being a subset of any telephone number translated from said dialed number, and means for routing said call over said network to said terminating switch using the selected network switch number, and not said dialed number.

26. The network of claim 25 further comprising at said originating switch, means for determining a class-of-service (COS) code derived from one or more call characteristics, said service code being used together with said selected network switch number by said routing means to route said call over said network and at said terminating switch, means for selecting a facility to connect to said called party location using said service code.

27. The network of claim 26 wherein the service code includes a service identification, a circuit selection, and a grade-of-service value determined from said one or more call characteristics.

28. The network of claim 27 wherein said one or more call characteristics includes signaling information received from one or more sources including calling party, stored information associated with an incoming facility over which the call is received, and a network database.

29. An originating switch for use in a communication network comprising means for receiving a dialed number over a trunk connected to said originating switch for establishing a call to a called party location, means for selecting a network switch number (NSN), which is selected independent of a calling party number, using said dialed number to identify a terminating switch of said network which connects to said called party location, the value of said network switch number not being a subset of said dialed number and not being a subset of any telephone number translated from said dialed number, and means for transmitting said network switch number over a second trunk to another switch of said network when the selected network switch number is not the same as the network switch number associated with originating switch.

30. The originating switch of claim 29 further comprising means for determining a class-of-service code derived from one or more call characteristics, said service code being used to select said second trunk.

31. The originating switch of claim 29 further comprising means for determining a class-of-service (COS) code derived from one or more call characteristics, said service code also being used to effect the selection of the network switch number.

32. The originating switch of claim 29 further comprising means for connecting to said called party location when the selected network switch number is the same as the network switch number of the originating switch.

33. An intermediate switch for use in a communication network including at least three switches, one of the switch nodes being an originating switch node which receives a dialed number from a calling party, said intermediate switch comprising means for receiving, over an incoming trunk, call routing information including a network switch number (NSN), which is selected independent of a calling party number, whose value is not a subset of said dialed number and is not a subset of any telephone number translated from said dialed number, and which identifies a terminating switch node, means for selecting an outgoing trunk to another switch using said network switch number, and means for transmitting said network switch number over said selected outgoing trunk.

34. The intermediate switch of claim 33 wherein said call routing information includes a class-of-service code, said selecting means using said service code in the process of selecting said selected outgoing trunk, and said transmitting means transmitting said service code over said selected outgoing trunk.

35. A terminating switch for use in a communication network including a plurality of switches, one of said plurality of switch nodes being an originating switch which receives a dialed number from a calling party, said terminating switch comprising means for receiving, over an incoming trunk, call routing information associated with a call received by said terminating switch, said call routing information including a class-of-service code and a network switch number (NSN) which is selected independent of a calling party number and which identifies said terminating switch, the value of said network switch number not being a subset of said dialed number and not being a subset of any telephone number translated from said dialed number, and means for selecting, using said service code, a facility to connect said call to a called party location.

* * * * *